United States Patent [19]

Prevot et al.

[11] Patent Number: 4,471,485
[45] Date of Patent: Sep. 11, 1984

[54] METHOD OF PROTECTION AGAINST ERRORS IN TRANSMISSION OF RADIOTELEGRAPH MESSAGES AND A DEVICE FOR THE APPLICATION OF SAID METHOD

[75] Inventors: Pascal Prevot; Bernard Durand, both of Paris, France

[73] Assignee: Thomson-CSF, Paris, France

[21] Appl. No.: 364,249

[22] Filed: Apr. 1, 1982

[30] Foreign Application Priority Data

Apr. 8, 1981 [FR] France .................. 81 07039

[51] Int. Cl.³ .................. G06F 11/10; H04L 1/08
[52] U.S. Cl. .................. 371/35; 371/37
[58] Field of Search .................. 371/35, 37

[56] References Cited

U.S. PATENT DOCUMENTS

| 3,413,600 | 11/1968 | Ohnsorge | 371/35 |
| 3,893,072 | 7/1975 | D'Antonio et al. | 371/35 |
| 3,938,085 | 2/1976 | Battail | 371/35 X |
| 4,344,171 | 8/1982 | Lin et al. | 371/35 |

FOREIGN PATENT DOCUMENTS 1293872 9/1966 Fed. Rep. of Germany .
1395396 5/1964 France .

OTHER PUBLICATIONS

Electronics, vol. 41, No. 1, Jan. 8, 1968 (New York), A. E. Fein, "Detecting Data Errors Boosts Transmission Accuracy", pp. 91–92.
Microprocessors and Microsystems, vol. 3, No. 5, Jun. 1979, Londres, P. F. Turney "Control of Protocol for Mobile Radios", pp. 203–209.
Proceedings of the IEEE, vol. 122, No. 2, Feb. 1975, London, R. M. F. Goodman et al.: "Data Transmission with Variable-Redundancy Error Control Over a High-Frequency Channel", pp. 113–118.

Primary Examiner—Charles E. Atkinson
Attorney, Agent, or Firm—Roland Plottel

[57] ABSTRACT

The method and device make use of an alternate two-way radiotelegraph link for establishing a communication between a transmitting station and a receiving station. Transmission of messages is synchronous and is performed by means of the error self-correction coding technique and the technique which involves repetition of the coded message or part of the message.

8 Claims, 3 Drawing Figures

METHOD OF PROTECTION AGAINST ERRORS IN TRANSMISSION OF RADIOTELEGRAPH MESSAGES AND A DEVICE FOR THE APPLICATION OF SAID METHOD

This invention relates to a method of protection against errors in transmission of radiotelegraph messages as well as to a device for the application of the method.

In a radiotelegraph network, the ionosphere channel is very frequently used for transmitting telegraph signals. Many problems of propagation are consequently encountered and this in turn results in the appearance of errors affecting the messages received at the receiving station. The methods of protection against errors make use of equipment known as a transmission coder and a reception decoder, depending on the direction of use. As a general rule, this equipment is placed between a transmitter which emits the radiotelegraph signal and a receiver which receives said signal with a time-lag and with distortions produced by the propagation medium at the time of transmission.

Thus the usual method adopted with a view to circumventing such drawbacks consists of self-correcting coding for detecting and automatically correcting the errors. A low residual error rate can be achieved but only at the cost of complexity of the computation unit used for decoding, the degree of complexity being often prohibitive.

A second answer to these transmission difficulties lies in the use of an error detection code and consists in carrying out a correction by retransmission. The transmitter sends an information or data block and awaits a positive or negative acknowledgment. If this acknowledgment is negative, the transmitter re-emits the block considered or else re-emits the following block. The transmitter continues to repeat the message as long as the detector encounters errors. Repetition of messages consequently takes place after sending service and acknowledgment signals. This is liable to give rise to errors, however, when the signals are not received or else when they are wrongly received. Furthermore, the number of messages sent is limited in time.

The object of the present invention is to provide a method of protection against errors in transmission of messages with a view to optimizing the transmitted data flow rate or throughput and ensuring a very low error rate. The invention also relates to a device of relatively low cost for carrying out said method.

The method according to the present invention makes use of an alternate two-way radiotelegraph link for establishing a communication between a transmitting station and a receiving station each provided with a receiver and a transmitter. The method consists in having recourse both to error correction coding and to a repetition procedure for transmission of coded messages. This transmission takes place in a synchronous manner and entails the following steps:

At the transmitting end,
suppression of start bits and end bits of the usual telegraphic code;
splitting of the messages into n-bit words;
coding of n-bit words in the form of k-bit words, where (k−n) is equal to p bits and p corresponds to correction and detection coding;
splitting of the message thus coded into blocks of N words consisting of k bits to which is added a z-bit control word, said N+1 word block being thus intended to constitute a field;
transmission of the block of N+1 words thus formed after having performed interlacing of order N+1 and added a bit and field synchronization sequence;

At the receiving end,
reception and decoding of each block of N+1 words emitted (by the transmitter station) in the presence of the synchronization sequence;
de-interlacing and correction of a maximum of one error per k-bit word and detection of words containing more than one error with formation of a repetition phrase of N+1 bits, each bit being intended to correspond to each word of the received block;
storage of error-free words in memory at a predetermined address;
reading of the control word z transmitted with the k-bit words;
transmission of a repetition request stage;
interruption of the communication.

The invention is also directed to a device for the practical application of the method referred-to in the foregoing.

The novel features considered characteristic of the invention are set forth in the appended claims. The invention itself, however, will be best understood from a study of the following detailed description in conjunction with the accompanying drawings, wherein:

Figure 1:
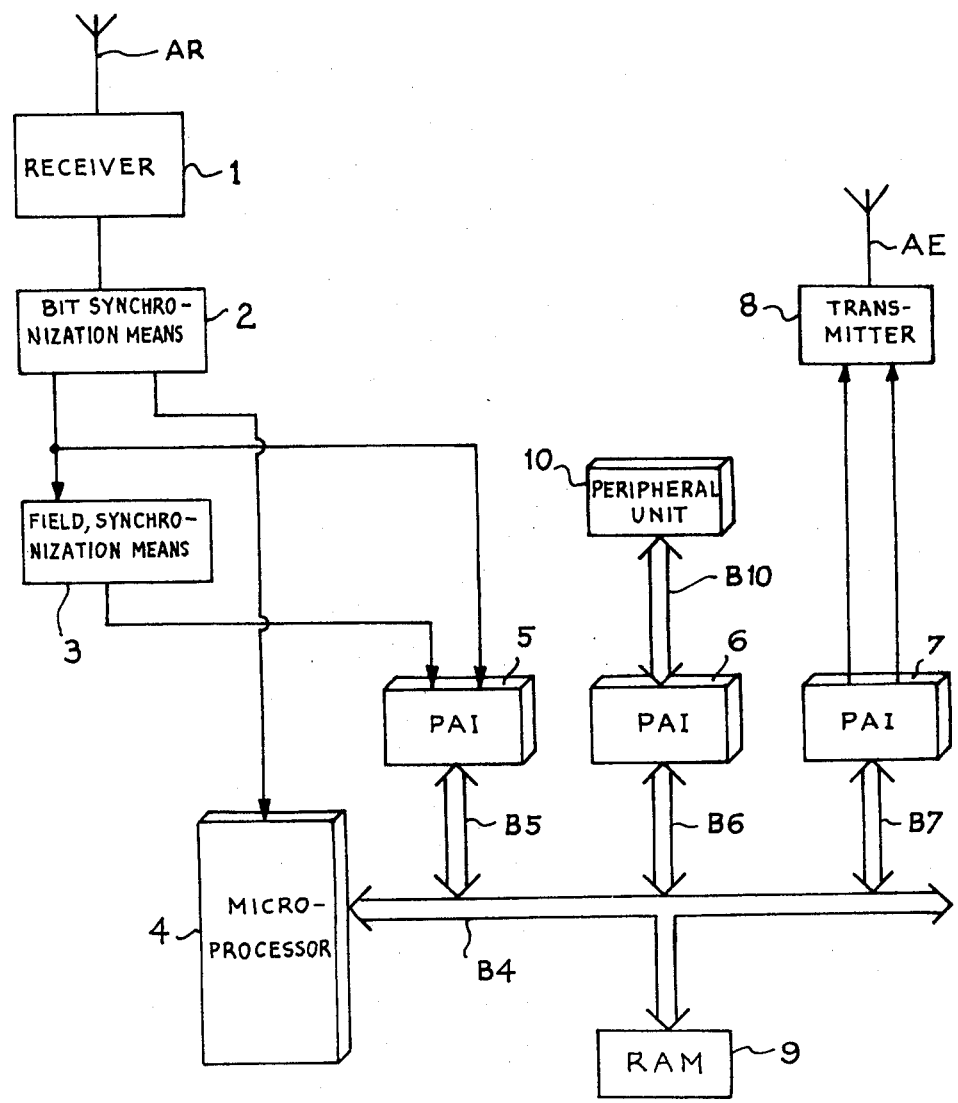
FIG. 1 is a block diagram of the device for carrying out the method according to the invention.

In order to carry out the method according to the invention, means are required for establishing a two-way radio link alternately in one direction and then in the other. Each station is therefore equipped with the device for carrying out the method according to the invention.

Each transmitter/receiver station is provided with a high-frequency transmitter/receiver 1 and 8, means 2 for producing a bit synchronization signal and delivering a clock signal, means 3 for producing a field synchronization signal 3 and delivering a synchronization detection signal, a microprocessor 4 which processes the telegraph signals, namely the messages which have been subjected to a sampling process, and which serves to carry out the method, an array of PIA-type peripheral adapter interfaces 5, 6, 7, one adapter 6 being connected to peripheral input/output units 10 associated with the microprocessor 4, a random-access memory (RAM) 9 associated with said microprocessor 4.

The frequency-shift keying receiver (FSK receiver) receives the modulated signal and, in this embodiment, the modulation rate is 125 bauds. The modulated signal is sent by the transmitting station and received by the receiving station by means of a receiving antenna AR. The receiver 1 transmits said signal after having carried out a demodulation by making use of means 2 for producing a bit synchronization signal. Said means are constituted by an assembly of variable-rank dividers which decode the signal in a conventional manner, deliver an output signal comprising a state sequence (0 or 1) and a clock signal. The transmission is synchronous, the transmitter carries out continuous "time-slicing" or subdivision into time intervals. In order to synchronize reading of the bits received by the receiver, a bit and field synchronization signal must be made available. The clock signal which serves to synchronize the transmitter at the transmission end and the receiver at the reception end is formed by means of the signal received by utilizing the 0 to 1 and 1 to 0 transitions of the data in order to maintain synchronization of the bits during transmission (a clock is set at the center of each bit). The output signal is transmitted to field synchronization means 3 constituted by an assembly of PN sequencers (of the pseudo-noise type known per se) which deliver the field synchronization detection signal in the form of "pseudo-noise" sequences represented by a binary word. The clock signal delivered by the bit synchronization means 2 is applied to the interruption control input of the microprocessor 4. Said microprocessor is of the 6802 type which operates on eight-bit words and carries out exchanges by means of a bidirectional-data bus and a 16-bit addressing bus both designated by the reference B4. Said microprocessor 4 is connected to the adapter interfaces 5, 6 and 7 (known as PIA interfaces, type 6821) via an eight-bit bidirectional data bus designated respectively by the references B5, B6, B7. The adapter interface 5 receives the clock signal and the output signal of the bit synchronization means 2. The adapter interface 6 is connected to the peripheral units 10 for input/output of messages and executive orders (teleprinter screen-keyboard) via a bidirectional bus line B10 and permits transmission of the orders given to the microprocessor 4. The interface 7 serves to deliver the signals to be sent by the transmitter 8 by means of its antenna AE upon reception of an order from the microprocessor 4. A random access memory 9 permits writing of the correct words of the message at a predetermined address and reading of the control words during the processing operation upon reception of an order from the microprocessor 4. The memory 9 is filled cyclically and management of addresses is carried out by the microprocessor 4. In this embodiment, the memory 9 must have a capacity of the order of 128 octets or eight-bit bytes.

Prior to transmission, the telegraph message to be sent by the transmitting station is processed by the microprocessor 4 as follows:

the start and end bits of the telegraph code employed at the level of the input/output unit 10 (screen-keyboard) are suppressed;

the message is subdivided into seven-bit words;

the seven-bit words are coded in the form of fifteen-bit words;

the coded message is subdivided into blocks of sixty-two coded words to which is added a fifteen-bit control word for indicating whether the message continues, whether the message has ended or whether the preceding block is repeated;

a block of sixty-three fifteen-bit words is emitted after interlacing of order 63 has been performed and after a bit and field synchronization sequence has been added, a field being a block of sixty-three words. The interlacing technique makes it possible to reduce transmission errors. It consists, prior to transmission, in storing a sequence of code words in a memory having the form of a matrix of m lines and n columns and in entering line after line, m words (m=63) according to a code having a length n (n=fifteen bits). The memory is then read column by column in order to transmit all the symbols.

The receiving station accordingly operates as follows:

Phase 1: a block emitted by the transmitting station is received and decoded if the synchronization sequence is received. Should this not be the case, the time required for complete reception of the block is allowed to elapse and the fifth phase described hereinafter is performed;

Phase 2: this step consists in performing the so-called deinterlacing operation. In other words, the digital train is entered in a matrix which is identical with the matrix employed for column-bycolumn interlacing and the data message is restituted by reading the matrix line by line. This is followed by a correcting operation, the correction being limited to one error per fifteenbit word; the words containing more than one error are detected and a 63-bit phrase is formed in which each bit corresponding to each word of the received block is set in state "1" solely in this case of error;

Phase 3: error-free words are stored in memory at their respective address. If the words which still contain errors include words which have already been emitted three times, a majority vote is carried out on the three results and the majority word obtained is stored in memory;

Phase 4: reading of the control word is then performed and, if it is unintelligible, the fifth phase is performed; if the control word indicates the end, the link is interrupted if there is no longer any erroneous word; if not, the station carries out the sixth phase;

Phase 5: in the event that the block is considered as nondecodable or in other words when the synchronization sequence is not received or when reading the control word and this latter is unintelligible, the repetition phrase consists of sixty-three bits in state "1";

Phase 6: the repetition phrase is coded by subdividing said phrase into nine seven-bit words to which is added one parity bit in order to constitute an eight-bit byte or octet. Each octet is then transferred to the principal message transmitter three times in succession, thus constituting a repetition request stage preceded by a bit and field synchronization sequence (field synchronization word).

The transmitting station processes the received messages as follows :

Phase 1: the repetition request stage emitted by the receiving station is received and decoded. If the synchronization is not included within the time allowed, the third phase is carried out;

Phase 2: the seven-bit word of the repetition phrase is decoded while carrying out a majority vote on the three octets corresponding to said word and comparing the parity of the first seven bits of the vote word obtained at its eighth bit which is the parity vote of each result. The word is accepted only if these bits are identical; if all the words are accepted, the fourth phase is carried out;

Phase 3: in this case the control word indicates an integral repetition request and the block is repeated in its entirety without its control word;

Phase 4: the head end of the block to be transmitted is constituted by fifteen-bit coded words which have to be repeated and are derived from the preceding block, whereupon said block to be transmitted is completed by fresh coded words of the message if such words remain or by "0" bits. Depending on which of these two cases applies, the control word indicates either continuation or the end;

Phase 5: after de-interlacing of the block thus obtained, this latter is transmitted and preceded by a bit and field synchronization sequence.

The phase cycle continues until interruption of the destination link.

Figure 2:
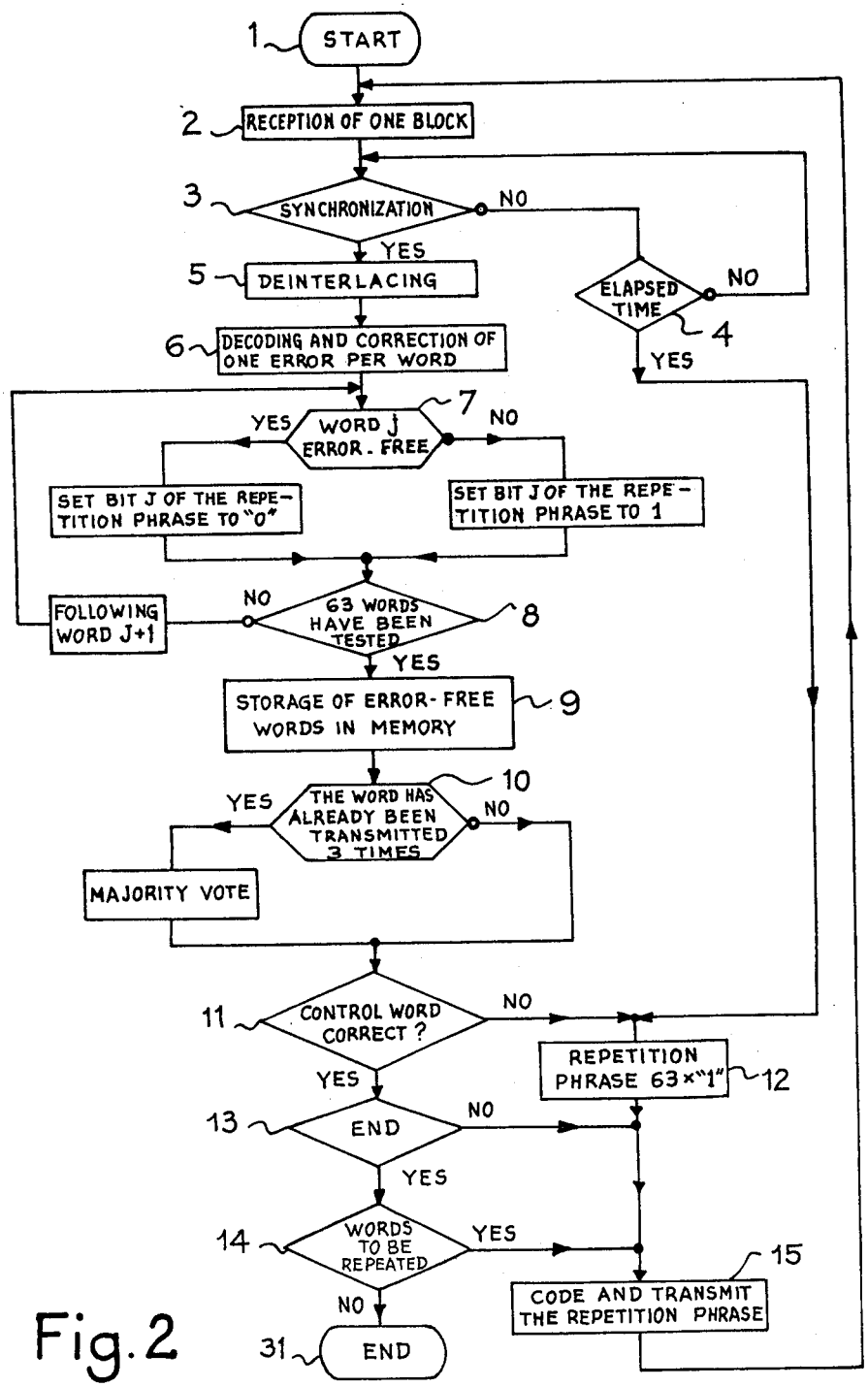
FIG. 2 is a flow diagram showing the reception of a message by the receiving station.

FIG. 2 is a flow chart representing the reception of a message by the receiving station. The chart consists of a group of block diagrams connected to each other by arrows and shows in greater detail the different performance steps (considered in the direction of the arrows) of the device for carrying out the method according to the invention as set forth hereunder:

Step 1: at the beginning, this step consists in initializing the process at the reception of a message;

Step 2: reception of one block of the message emitted by the transmitting station;

Step 3: test on the synchronization signal—is the receiving station synchronized?
  answer *yes:* performance of the fifth step;
  answer *no:* in that case the following step is performed;

Step 4: test carried out on the elapsed time interval—is this interval longer than the time necessary for complete reception of the block?
  answer *yes:* in that case the twelfth step is performed;
  answer *no:* in that case the third step is again performed and followed by all the remaining steps;

Step 5: de-interlacing of the block;

Step 6: decoding and correction of one error per word of the block;

Step 7: test carried out on each word of the block—is the tested word J error-free?
  answer *no:* set the bit corresponding to this word at "1" in the repetition phrase;
  answer *yes:* set the bit corresponding to said word at "0" in the repetition phrase;

Step 8: test carried out on the number of tested words—have the 63 words been tested?
  answer *no:* it is necessary in that case to pass to the following word and to perform the seventh step;
  answer *yes:* the following step is performed;

Step 9: storage of error-free words in their positions in memory;

Step 10: test carried out on the number of times words which still contain errors have been transmitted—has the word already been transmitted three times?
  answer *yes:* it is necessary in that case to carry out a majority vote and then to pass to the next step;
  answer *no:* it is necessary in that case to pass to the next step;

Step 11: test carried out on the control word—is this word correct?
  answer *no:* the twelfth step should be performed;
  answer *yes:* the thirteenth step should be performed;

Step 12: the 63 bits of the repetition phrase should be set at "1" followed by performance of the fifteenth step;

Step 13: test for determining whether this is the end of the message;
  answer *no:* perform in that case the fifteenth step;
  answer *yes:* the next step should be performed;

Step 14: test for determining whether there are any words to be repeated;
  answer *yes:* perform the next step;
  answer *no:* in that case the thirty-first step should be performed;

Step 15: the repetition phrase should be coded and transmitted. When said phrase has been transmitted, all the steps should be carried out, starting from the second step;

Step 31: end—interruption of communication.

Figure 3:
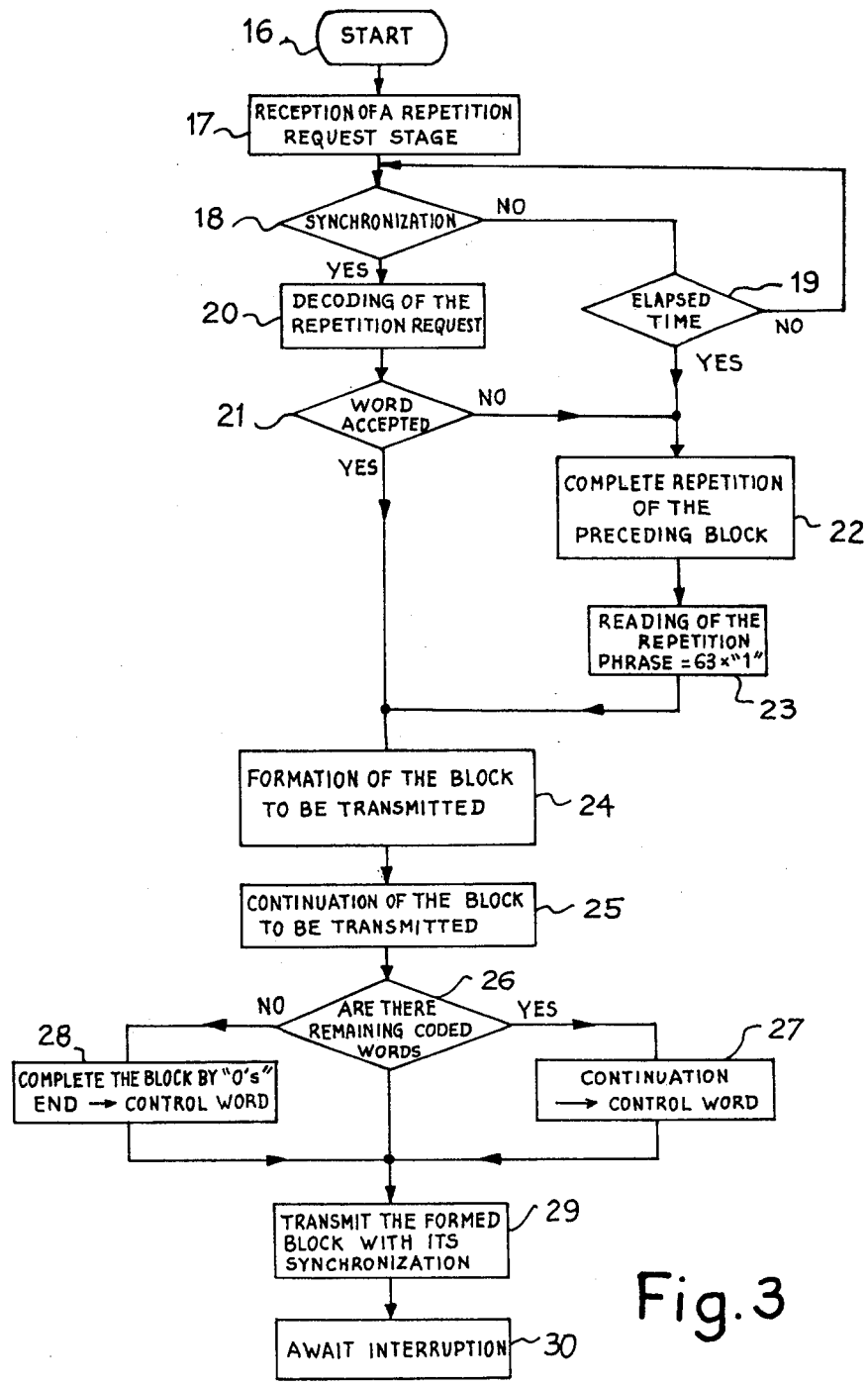
FIG. 3 is a flow diagram showing the reception of repetition requests sent by the receiving station to the message-transmitting station.

FIG. 3 is a flow chart showing the reception of the repetition request sent by the receiving station to the message-transmitting station. The following steps are performed:

Step 16: the beginning of this step consists in initializing the process at the reception of the repetition request;

Step 17: reception of a repetition request stage;

Step 18: test carried out on the synchronization signal. Is the transmitting station (which receives the repetition request signal) synchronized?
  answer *yes:* in that case, the twentieth step should be performed;
  answer *no:* the next step should be performed;

Step 19: test carried out on the elapsed time interval—is this interval longer than the time necessary for receiving the repetition stage;
  answer *yes:* in that case, the twenty-second step should be performed;
  answer *no:* in that case, the eighteenth step should again be performed followed by all the remaining steps;

Step 20: decoding of the repetition request;

Step 21: test carried out on the seven-bit word of the repetition phrase—is the word accepted?
  answer *no:* the next step should accordingly be performed;
  answer *yes:* step 24 should accordingly be performed;

Step 22: reading of the control word : this latter denotes complete repetition of the preceding block;

Step 23: reading of the repetition phrase comprising sixtythree bits equal to "1";

Step 24: formation of the block to be transmitted, said block being completed by the words of the preceding block to be repeated;

Step 25: continuation of the block to be transmitted with the remaining coded words of the message to be transmitted;

Step 26: test to be carried out—are there any remaining coded words of the message to be transmitted?
  answer *yes:* in that case, the next step should be performed;
  answer *no:* in that case, the twenty-eighth step should be performed;

Step 27: coding of the continuation should be written in the control word and the twenty-ninth step should then be performed;

Step 28: the block should be completed by "0's" and the end coding should be written in the control word followed by performance of the next step;

Step 29: the formed block together with its synchronization should be transmitted;

Step 30: await interruption of the communication.

The method has the advantage of being applied by means of a microprocessor and a combined assembly of means which are utilized in conjunction with said microprocessor and entail low capital cost. A further advantage of the method is that it guarantees a very low transmission error rate by adopting the self-correcting code technique and the retransmission technique.

What is claimed is:

1. A method of protection against errors in transmission of radiotelegraph messages utilizing an alternate two-way radiotelegraph link for establishing a communication between a transmitting station and a receiving station each provided with a receiver and a transmitter, wherein the method consists in having recourse both to error self-correction coding and to a repetition procedure for transmission of coded messages, said transmission being carried out in a synchronous manner and the following steps being involved:

at the transmitting end,
suppression of start bits and end bits of the usual telegraphic code;
splitting of the messages into n-bit words;
coding of n-bit words in the form of k-bit words, where (k−n) is equal to p bits and p corresponds to correction and detection coding;
splitting of the message thus coded into blocks of N words consisting of k bits to which is added a z-bit control word, said N+1 word block being thus intended to constitute a field;
transmission of the blocks thus formed after having performed interlacing of order N+1 and adding a bit and field synchronization sequence;

at the receiving end,
reception and decoding of each block emitted (by transmitting station) in the presence of the synchronization sequence;
de-interlacing and correction of a maximum of one error per erroneous k-bit word and detection of words containing more than one error with formation of a repetition prase of N+1 bits, each bit being intended to correspond to each word of the received block;
reading of the control word z transmitted with the k bit words
storage of error-free words in memory at a predetermined address;
transmission of a repetition request message
interruption of the communication link.

2. A method of protection against errors in transmission of radiotelegraph messages according to claim 1, wherein the z-bit control word is a word of k bits (z=k) and wherein the field constituted by the set of N words plus the z-bit word is thus constituted by N+1 k-bit words comprising L repeated words of the preceding message.

3. A method of protection against errors in transmission of radiotelegraph messages according to claim 1, wherein the repetition request phrase is constituted by N+1/n n-bit words plus 1 parity bit, each (n+1) bit being transmitted at least three times in succession so as to constitute the stage preceded by a bit synchronization and field synchronization sequence.

4. A method of protection against errors in transmission of radiotelegraph messages according to claim 3 wherein, after the message has been sent by the receiving station, the transmitting station receives and decodes the repetition request message when the synchronization is carried out during the time allowed, the words of n+1 bits repreated at least three times being subjected to a majority vote for determining the error-free word, wherein, when a number of words are erroneous, the transmitting station delivers a block constituted at the head end by k-bit coded words which have to be repeated and form part of the preceding block and by fresh coded words of the message, and wherein the block is entirely repeated without its control word when the control word denotes complete repetition.

5. A device for protection against errors in transmission of messages by radio in which an alternate two-way radiotelegraph link is established between a transmitting station and a receiving station each hsving a receiver and a transmitter, comprising bit synchronization means connected to the receiver for delivering an output signal and a clock signal, field synchronization means connected to the bit synchronization means for delivering a synchronization detection signal, a microprocessor having an interruption request input connected to the clock output of the bit synchronization means for performing the steps of:

at the transmitting end,
suppression of start bits and end bits of the usual telegraphic code;
splitting of the messages into n-bit words;
coding of n-bit words in the form of k-bit words, where (k−n) is equal to p bits and p corresponds to correction and detection coding;
splitting of the message thus coded into blocks of N words consisting of k bits to which is added a z-bit control word, said N+1 word block being thus intended to constitute a field;
transmission of the blocks thus formed after having performed interlacing of order N+1 and adding a bit and field synchronization sequence; C at the receiving end,
reception and decoding of each block emitted (by the transmitting station) in the presence of the synchronization sequence;
de-interlacing and correction of a maximum of one error pererroneous k-bit word and detection of words containing more than one error with formation of a repetition phrase of N+1 bits, each bit being intended to correspond to each word of the received block;
reading of the control word z transmitted with the k-bit words;
storage of error-free words in memory at a predetermined adresse;
transmission of a repetition request message;
interruption of the communication link;

and array of peripheral equipment interfaces connected to the microprocessor via a bus line, storage means connected via said bus line to the microprocessor which is thus permitted to write and then to read the data managed by said microprocessor.

6. A device according to claim 5, wherein a first interface circuit is connected to the clock output of the bit synchronization means and is connected to the field synchronization detection output of the field synchronization means, wherein a second interface circuit is connected via a bidirectional bus line to an input/output peripheral unit, and wherein a third interface circuit is connected to the transmitter.

7. A device according to claim 5, wherein the receiver is of the type known as a frequency-shift keying (FSK) receiver.

8. A device according to claim 5, wherein the storage means are constituted by a read/write random-access memory.

* * * * *